(12) United States Patent
Mathai et al.

(10) Patent No.: US 10,253,652 B2
(45) Date of Patent: Apr. 9, 2019

(54) SYSTEM AND METHOD FOR CONTROLLING GAS TURBINE OUTPUT VIA AN EXHAUST DAMPER

(71) Applicant: General Electric Company, Schenectady, NY (US)

(72) Inventors: George Vargese Mathai, Atlanta, GA (US); Alston Ilford Scipio, Mableton, GA (US); Harold Lamar Jordan, Jr., Greenville, SC (US); Sanji Ekanayake, Mableton, GA (US); Joseph Philip Klosinski, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 14/969,051

(22) Filed: Dec. 15, 2015

(65) Prior Publication Data
US 2017/0167300 A1 Jun. 15, 2017

(51) Int. Cl.
*F01D 25/30* (2006.01)
*F02C 9/20* (2006.01)
*F01K 23/10* (2006.01)
*F02C 6/18* (2006.01)

(52) U.S. Cl.
CPC ............ *F01D 25/30* (2013.01); *F01K 23/101* (2013.01); *F02C 6/18* (2013.01); *F02C 9/20* (2013.01); *F05D 2270/05* (2013.01); *F05D 2270/053* (2013.01); *Y02E 20/16* (2013.01)

(58) Field of Classification Search
CPC ........ F01D 25/30; F01K 23/101; F01K 23/10; F02C 9/20; F02C 6/18; F02C 9/24; F05D 2270/05; F05D 2270/053; Y02E 20/16
See application file for complete search history.

(56) References Cited

U.S. PATENT DOCUMENTS

| | | | | | |
|---|---|---|---|---|---|
| 3,280,551 | A | * | 10/1966 | Bracken | ................ F01K 23/101 |
| | | | | | 122/179 |
| 3,372,677 | A | * | 3/1968 | Boyen | ................... F01K 23/101 |
| | | | | | 122/249 |
| 3,965,675 | A | * | 6/1976 | Martz | ..................... F01K 13/02 |
| | | | | | 60/39.182 |

(Continued)

OTHER PUBLICATIONS

Co-pending U.S. Appl. No. 14/969,032, filed Dec. 15, 2015.

(Continued)

*Primary Examiner* — Gerald L Sung
*Assistant Examiner* — Alain Chau
(74) *Attorney, Agent, or Firm* — Charlotte C. Wilson; Ernest G. Cusick; Frank A. Landgraff

(57) ABSTRACT

A system for controlling gas turbine output for a gas turbine power plant is disclosed herein. The power plant includes a gas turbine including a combustor downstream from a compressor, a turbine downstream from the combustor and an exhaust duct downstream from the outlet of the turbine. The exhaust duct receives exhaust gas from the turbine outlet. The system further includes an exhaust damper operably connected to a downstream end of the exhaust duct. The exhaust damper increases backpressure at the turbine outlet and restricts axial exit velocity of the exhaust gas exiting the turbine outlet when the exhaust damper is partially closed. A method for controlling gas turbine output is also provided herein.

15 Claims, 2 Drawing Sheets

(56) References Cited

U.S. PATENT DOCUMENTS

| | | | | |
|---|---|---|---|---|
| 4,081,956 A * | 4/1978 | Baker | | F01K 9/04 290/40 R |
| 4,362,013 A * | 12/1982 | Kuribayashi | | F01K 23/10 60/39.182 |
| 4,437,313 A * | 3/1984 | Taber | | F01K 23/101 60/39.182 |
| 5,867,987 A | 2/1999 | Halimi et al. | | |
| 6,442,941 B1 | 9/2002 | Anand et al. | | |
| 6,543,234 B2 | 4/2003 | Anand et al. | | |
| 6,748,734 B1 * | 6/2004 | Coleman | | F01D 25/30 122/7 B |
| 6,957,540 B1 * | 10/2005 | Briesch | | F01K 23/106 60/39.181 |
| 7,555,890 B2 * | 7/2009 | Kurihara | | F02C 9/16 60/39.182 |
| 8,209,951 B2 | 7/2012 | Hibshman, II | | |
| 8,844,262 B2 | 9/2014 | Sutterfield | | |
| 9,103,279 B2 | 8/2015 | Zhang et al. | | |
| 2001/0034582 A1 * | 10/2001 | Umezawa | | G05B 23/024 702/136 |
| 2002/0023423 A1 * | 2/2002 | Viteri | | F01K 21/047 60/772 |
| 2005/0034445 A1 * | 2/2005 | Radovich | | F01K 13/02 60/39.182 |
| 2011/0000220 A1 * | 1/2011 | Hibshman, II | | F01K 23/101 60/783 |
| 2013/0118146 A1 * | 5/2013 | Nanataki | | F02C 9/00 60/39.182 |
| 2014/0299306 A1 * | 10/2014 | Bindra | | F28D 20/0056 165/200 |
| 2015/0007579 A1 * | 1/2015 | Curran | | F01K 23/10 60/772 |
| 2015/0143812 A1 * | 5/2015 | Baruzzini | | F02K 1/822 60/772 |
| 2015/0185716 A1 * | 7/2015 | Wichmann | | F01K 23/101 700/287 |

OTHER PUBLICATIONS

Co-pending U.S. Appl. No. 14/969,594, filed Dec. 15, 2015.
Co-pending U.S. Appl. No. 14/969,067, filed Dec. 15, 2015.
Co-pending U.S. Appl. No. 14/969,079, filed Dec. 15, 2015.
Co-pending U.S. Appl. No. 14/969,098, filed Dec. 15, 2015.
Co-pending U.S. Appl. No. 14/969,224, filed Dec. 15, 2015.
Co-pending U.S. Appl. No. 14/969,118, filed Dec. 15, 2015.
Co-pending U.S. Appl. No. 14/969,142, filed Dec. 15, 2015.
Co-pending U.S. Appl. No. 14/969,157, filed Dec. 15, 2015.
Co-pending U.S. Appl. No. 14/969,165, filed Dec. 15, 2015.
Co-pending U.S. Appl. No. 14/969,185, filed Dec. 15, 2015.
Co-pending U.S. Appl. No. 14/969,200, filed Dec. 15, 2015.

* cited by examiner

SYSTEM AND METHOD FOR CONTROLLING GAS TURBINE OUTPUT VIA AN EXHAUST DAMPER

FIELD OF THE DISCLOSURE

The present disclosure generally relates to a gas turbine power plant such as a combined cycle or cogeneration power plant. More particularly, the present disclosure relates to a system and a method for controlling gas turbine output capacity.

BACKGROUND OF THE DISCLOSURE

A gas turbine power plant such as a combined cycle or cogeneration power plant generally includes a gas turbine having a compressor, a combustor, a turbine, a heat recovery steam generator (HRSG) that is downstream from the turbine and a steam turbine in operably connected to the HRSG. During operation, air enters the compressor via an inlet system and is progressively compressed as it is routed towards a compressor discharge casing prior to entering the combustor. A portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits via an outlet of the turbine as exhaust gas and the exhaust gas is routed to the HRSG. Thermal energy from the exhaust gas may be transferred to water flowing through one or more heat exchangers of the HRSG, thereby producing superheated steam. The superheated steam may then be routed into the steam turbine to generate additional electricity and/or may be routed to support various secondary operations at the power plant or cogeneration site, thus enhancing overall power plant or cogeneration capability.

Output of the gas turbine may be restricted at certain ambient and load conditions in order to avoid mechanical/vibrational limitations of turbine rotor blades positioned at or proximate to the turbine outlet. This output restriction is related to the axial exit velocity of the exhaust gas as it exits the turbine outlet. Once a maximum axial exit velocity or Mach number is reached, the output of the gas turbine is reduced or derated by controls methodology in order to not exceed the allowable mechanical limits. As a result, generator/power output and/or thermal energy output for combined or cogeneration cycle operation is reduced.

BRIEF DESCRIPTION

Aspects and advantages of the disclosure are set forth below in the following description, or may be obvious from the description, or may be learned through practice of the disclosure.

One embodiment of the present disclosure is directed to a power plant. The power plant includes a gas turbine including a combustor downstream from a compressor, a turbine downstream from the combustor and an exhaust duct downstream from an outlet of the turbine. The exhaust duct receives exhaust gas from the turbine outlet. The system further includes an exhaust damper operably connected to a downstream end of the exhaust duct. The exhaust damper increases backpressure at the turbine outlet and restricts axial exit velocity of the exhaust gas exiting the turbine outlet when the exhaust damper is at least partially closed.

One embodiment of the present disclosure is directed to a method for controlling power plant output. The method includes selecting an operation mode for a gas turbine of a power plant via an input to a controller and adjusting exhaust backpressure at an outlet of a turbine of the gas turbine via an exhaust damper downstream from the turbine outlet based on the operation mode selected.

Those of ordinary skill in the art will better appreciate the features and aspects of such embodiments, and others, upon review of the specification.

BRIEF DESCRIPTION OF THE DRAWINGS

A full and enabling disclosure, including the best mode thereof to one skilled in the art, is set forth more particularly in the remainder of the specification, including reference to the accompanying figures, in which.

DETAILED DESCRIPTION

Figure 1:
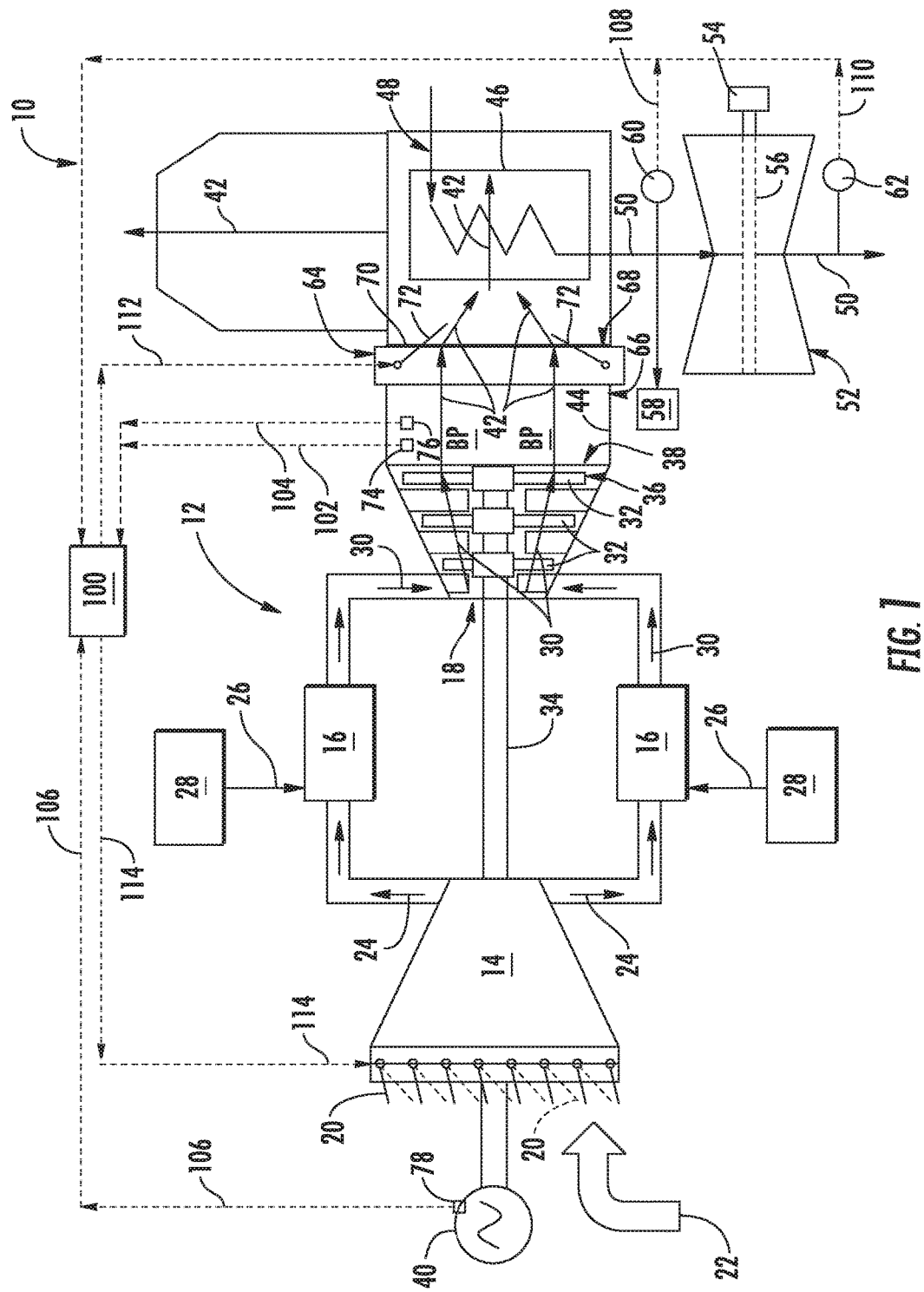
FIG. 1 is a schematic diagram of an exemplary gas turbine based combined cycle/cogeneration power plant according to one embodiment of the present disclosure.
Figure 2:
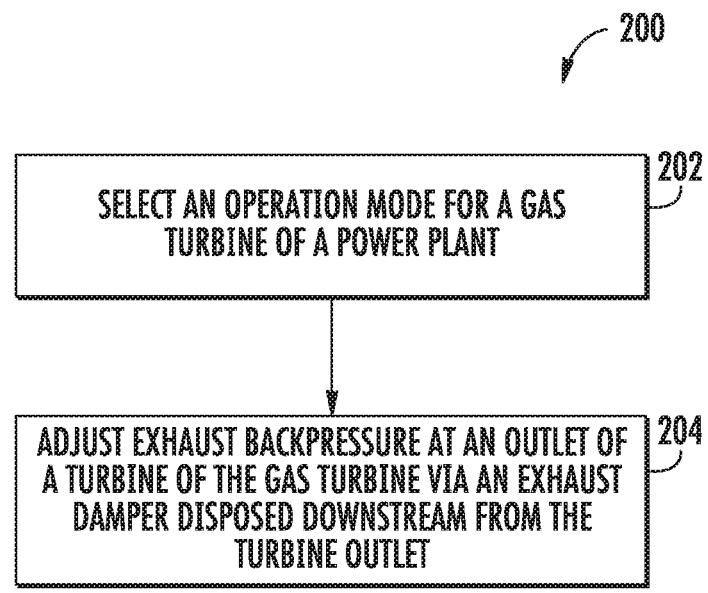
FIG. 2 is a flow diagram of a method for controlling power plant output.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts within the disclosure. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

In a conventional co-generation power plant, fuel and air are supplied to a gas turbine. Air passes through an inlet of the gas turbine into the compressor section upstream of combustors in the gas turbine. After the air is heated by combustors, the heated air and other gases produced in the process (i.e., combustion gas) pass through the turbine section. The exhaust gas from the gas turbine passes from the turbine section to an exhaust section of the gas turbine, and flows to a heat recovery steam generator (HRSG) that extracts heat from the exhaust gas via one or more heat exchangers to produce steam.

In certain instances, it may be desirable to increase gas turbine generator output and/or exhaust gas thermal energy at levels which may exceed normal gas turbine operational limits which are related to mechanical/vibrational design limitations of the turbine rotor blades, particularly those positioned at or proximate to the turbine outlet. The present embodiments described herein provide a system and method for controlling power plant output which allows a gas turbine to operate above the design limitations of the various turbine components by increasing backpressure at the turbine outlet. By increasing the backpressure at the turbine outlet, the system reduces the axial exit velocity of the exhaust gases from the turbine outlet, thereby reducing and/or preventing turbine rotor blade flutter, particularly at the last stage of turbine rotor blades positioned at or proximate to the turbine outlet.

The embodiments provided herein provide various technical advantages over existing gas turbine based simple cycle, cogeneration or combined cycle power plants. For example, the system and corresponding method provided herein may provide for additional electrical power generation during periods of peak electrical demands and/or may provide for additional exhaust energy generation for a heat recovery steam generation system (HRSG) so as to increase steam production during periods of peak demands for cogeneration operations.

Referring now to the drawings, wherein identical numerals indicate the same elements throughout the figures, FIG. 1 provides a functional block or flow diagram of an exemplary gas turbine power plant 10 with steam production capability. The power plant 10 comprises a gas turbine 12 that may incorporate various embodiments of the present disclosure. The gas turbine 12 generally includes, in serial flow order, a compressor 14, a combustion section having one or more combustors 16 and a turbine 18. The gas turbine 12 may also include inlet guide vanes 20 disposed at an inlet or upstream end of the compressor 14. In operation, air 22 flows across the inlet guide vanes 20 and into the compressor 14. The compressor 14 imparts kinetic energy to the air 22 to produce compressed air as indicated schematically by arrows 24. The inlet guide vanes 20 may be adjusted between a fully open position and a partially closed position to control the flow rate of the air 22 entering the compressor 14.

The compressed air 24 is mixed with a fuel 26 such as natural gas from a fuel supply system 28 to form a combustible mixture within the combustor(s) 16. The combustible mixture is burned to produce combustion gas as indicated schematically by arrows 30 having a high temperature, pressure and velocity. As the combustion gas 30 flows through the turbine 18 kinetic energy is transferred from the combustion gas 30 to various rows of turbine rotor blades 32 coupled to a rotor shaft 34, thus casing the rotor shaft 34 to rotate and produce work. The turbine rotor blades 32 are arranged in multiple axially spaced rows or stages along the rotor shaft 34. A last stage 36 of the turbine rotor blades 32 is positioned at or proximate to an outlet or downstream end 38 of the turbine 18.

The turbine 18 may have two or more stages, for example, a low pressure section and a high pressure section. In one embodiment, the turbine 18 may be a two-shaft turbine that includes a low pressure section and a high pressure section. In particular configurations, the turbine 18 may have 3 or more stages of turbine rotor blades 32. The rotor shaft 34 may be coupled to and drive the compressor 14 to produce the compressed air 24. Alternately or in addition, the rotor shaft 34 may connect the turbine 18 to a generator 40 for producing electricity. The combustion gas 30 loses thermal and kinetic energy as it flows through the turbine 18 and exits the outlet 38 of the turbine 18 as exhaust gas 42 via an exhaust duct or diffuser 44 that is operably coupled to the turbine outlet 38.

In particular embodiments, the exhaust duct 44 may be fluidly coupled to a heat exchanger or boiler 46 via various pipes, ducts, valves and the like. The heat exchanger 46 may be a standalone component or may be a component of a heat recovery steam generator (HRSG) 48. In various embodiments, the heat exchanger 46 may be used to extract thermal energy from the exhaust gas 42 to produce steam 50. In particular embodiments, the steam 50 may then be routed to a steam turbine 52 via various pipes, valves conduits or the like to produce additional power or electricity via a generator 54 coupled to a shaft 56 of the steam turbine 52.

In particular embodiments, at least a portion of the steam 50 may be piped from the heat exchanger 46 and/or the steam turbine 52 to an onsite or offsite facility 58 that distributes the steam 50 to users and/or utilizes the steam for secondary operations such as heat production or other industrial operations or processes. Steam temperature, flow rate, output from the heat exchanger 46 may be monitored via one or more sensors or flow monitors. For example, in one embodiment, one or more sensors or flow monitors 60, 62 may be provided downstream from the heat exchanger 46 and/or downstream from the steam turbine 52, respectively.

In various embodiments, the power plant 10 includes an exhaust damper 64 operably connected to the downstream end 38 of the turbine 18 and/or to a downstream end 66 of the exhaust duct 44 and positioned upstream from the heat exchanger 46 and/or HRSG 48. In one embodiment, an inlet portion 68 of the HRSG 48 is operably connected to a downstream end 70 of the exhaust damper 64 such that the inlet portion 68 receives the exhaust gas 42 from the exhaust damper 64.

In operation, the exhaust damper 64 increases exhaust backpressure BP at the turbine outlet 38 upstream from the exhaust damper 64 when the exhaust damper 64 is at least partially closed, thereby restricting/reducing axial exit velocity of the exhaust gas 42 as the exhaust gas 42 exits the turbine outlet 38. This increase in exhaust backpressure BP at or proximate to the turbine outlet 38 allows for an increase in gas turbine or power plant output capacity, since the gas turbine is not derated to avoid turbine axial exit velocity limits. For example, by at least partially closing the exhaust damper 64 and increasing the exhaust backpressure BP and thereby decreasing the axial exit velocity, an operator may increase gas turbine and/or power plant output without exceeding mechanical or vibrational design limitations of the turbine rotor blades 32, particularly the turbine rotor blades 32 of the last turbine stage 36. As a result, the power plant 10 may generate more electricity during high demand or peak demand periods and/or generate more thermal energy for steam production without compromising turbine rotor blade life when compared to a conventional operation of the gas turbine.

The exhaust damper 64 may be any type of flow damper or flow restrictor suitable for its intended use. For example, in one embodiment, the exhaust damper 64 may be a louvered damper having one or more louvers 72 that may be incrementally actuated via mechanical, electric, pneumatic or hydraulic or the like actuators between a fully open or at least partially closed position so as to increase or decrease the exhaust backpressure BP at or proximate to the turbine outlet 38, thereby controlling axial exit velocity of the exhaust gas 42 exiting the turbine outlet 38. In one embodiment, the exhaust damper 64 may be a guillotine damper. The guillotine damper may include one or more doors that may be incrementally actuated vertically via mechanical, electric, pneumatic or hydraulic actuators between a fully open or at least partially closed position so as to increase or decrease the backpressure BP at the turbine outlet 38, thereby controlling axial exit velocity of the exhaust gas 42 exiting the turbine outlet 38.

In various embodiments, the power plant 10 includes a controller 100 electronically coupled to the exhaust damper 64. The controller 100 may be a microprocessor based processor that includes a non-transitory memory and that has the capability to calculate algorithms. For example, the controller 100 may incorporate a General Electric SPEEDTRONIC™ Gas Turbine Control System, such as a SPEEDTRONIC™ Mark VI or Mark VIe Gas Turbine Control System manufactured by or for GE Power & Water Systems of Schenectady, N.Y. The controller 100 may also incorporate a computer system having a processor(s) that executes programs stored in a memory to control the operation of the gas turbine using sensor inputs and instructions from human operators.

In particular embodiments, the controller 100 may be programmed to actuate the exhaust damper 64 to control the exhaust backpressure BP at the turbine outlet 38 of the turbine 18, such as in the exhaust duct 44 upstream from the exhaust damper 64. The controller 100 may also be programmed to actuate the inlet guide vanes 20, thereby increasing or decreasing the volume of air 22 entering the compressor 14.

The controller 100 may be programmed with an axial exit velocity limit or value which corresponds to a predefined axial flow velocity limit of the exhaust gas 42 flowing from the turbine outlet 38. The axial exit velocity limit may be stored in the memory of the controller 100 or may be inputted into the controller in real-time by an operator. The axial exit velocity limit may be based on particular design limitations of various hardware components of the turbine 18 such as, but not limited to, vibrational/mechanical design limitations of the turbine rotor blades 32, particularly of the last stage 36.

In operation, the controller 100 may receive one or more input data signals corresponding to the exhaust backpressure 102 from a pressure sensor(s) 74 proximate to the turbine outlet 38 and/or within the exhaust duct 44, and/or axial exit velocity 104 from a flow velocity sensor 76 proximate to the turbine outlet 38 and/or within the exhaust duct 44. The controller 100 may receive one or more data input signals corresponding to power output 106 from a power sensor 78 coupled to the gas turbine generator 40. The controller 100 may receive one or more data input signals corresponding to steam flow rate 108, 110 via sensors 60, 62. Based at least in part on one or more of signals 102, 104, 106, 108 and 110, the controller 100 may then regulate the gas turbine output and/or power plant output (i.e. power output and/or thermal output) by generating and/or sending an appropriate control signal 112 causing the exhaust damper 64 to incrementally move between a partially closed position and a fully open position, thereby controlling the exhaust gas back pressure BP, thus the axial exit velocity of the exhaust gas 42 proximate to the turbine outlet 38.

In particular embodiments, the controller 100 may generate and/or send control signal 112 to the exhaust damper 64 thereby causing the exhaust damper 64 to partially open, thereby reducing gas turbine output capacity, or partially close the exhaust damper 64, thereby increasing gas turbine output capacity, based in part on the exhaust backpressure data signal 102 provided by pressure sensor 74. In addition or in the alternative, the controller 100 may generate and/or send control signal 112 to the exhaust damper 64 thereby causing the exhaust damper 64 to partially open, thereby reducing gas turbine output capacity, or partially close, thereby increasing gas turbine output capacity, based on the axial exit velocity data signal 104 provided by flow velocity sensor 76. In addition or in the alternative, the controller 100 may generate and/or send control signal 112 to the exhaust damper 64 thereby causing the exhaust damper 64 to partially open, thereby reducing gas turbine output capacity, or partially close, thereby increasing gas turbine output capacity, based on power output data signal 106 provided by power output sensor 78.

In particular embodiments, the controller 100 may generate and/or send control signal 114 to the inlet guide vanes 20 causing the inlet guides vanes 22 to actuate or bias towards a fully open position, thereby increasing air flow volume into the compressor 14 and increasing thermal output of the gas turbine 10. In particular embodiments, the controller 100 may generate and/or send control signal 114 to the inlet guide vanes 20 causing the inlet guides vanes 22 to actuate or bias towards a partially closed position, thereby decreasing air flow volume into the compressor 14 and decreasing thermal output of the gas turbine 10. Control signal 114 may be based on steam flow rate 114.

The various embodiments described herein provide a method 200 for controlling gas turbine and/or power plant output. In one embodiment at step 202, method 200 includes selecting an operation mode for a gas turbine of the power plant via an input to the controller 100. The operation mode may correspond to an operation mode which optimizes power plant or gas turbine output over power plant heat rate. The operation mode may correspond to an operational mode whereby increased or maximum power output and/other thermal output for steam production is desired such as during peak power demand. At step 204, method 200 includes adjusting the exhaust backpressure at the turbine outlet 38, via the exhaust damper 64, based on the operation mode selected.

Method 200 may further include biasing the inlet guide vanes 20 towards a fully open position and partially closing the exhaust damper 64 to increase thermal energy output of the gas turbine 10. Method 200 may further include monitoring the axial exit velocity of the exhaust gas upstream from the exhaust damper 64. Method 200 may further include partially closing the exhaust damper 64 and increasing the exhaust backpressure BP when the axial exit velocity of the exhaust gas 42 approaches a predefined axial exit velocity limit.

Although specific embodiments have been illustrated and described herein, it should be appreciated that any arrangement, which is calculated to achieve the same purpose, may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed:

1. A power plant, comprising:
   a gas turbine including a combustor downstream from a compressor, a turbine downstream from the combustor and an exhaust duct downstream from a turbine outlet, wherein the exhaust duct receives exhaust gas from the turbine outlet;
   an exhaust damper operably connected to a downstream end of the exhaust duct;
   a heat recovery steam generator having an inlet portion connected to a downstream end of the exhaust damper; and
   a controller electronically coupled to the exhaust damper, wherein the controller is configured to generate a first signal during an operating period of peak demand which causes the exhaust damper to at least partially close, and wherein, when the exhaust damper is at least partially closed, the exhaust damper increases backpressure at the turbine outlet and restricts axial exit velocity of the exhaust gas exiting the turbine outlet;
   wherein the first signal is based on data received from a sensor electronically coupled to the controller, the sensor measuring at least one of an exhaust pressure at the turbine outlet, an exhaust exit velocity exiting the turbine outlet, a power output of the power plant, or a steam flow rate from the heat recovery steam generator.

2. The power plant as in claim 1, wherein the exhaust damper is a guillotine damper.

3. The power plant as in claim 1, wherein the exhaust damper is a louver damper.

4. The power plant as in claim 1, further comprising a pressure sensor electronically connected to the controller and located upstream from the exhaust damper and proximate to the turbine outlet; and wherein the controller is configured to generate a second signal which causes the exhaust damper to at least partially open or at least partially close based on an exhaust backpressure data signal provided by the pressure sensor.

5. The power plant as in claim 1, further comprising a flow velocity sensor electronically connected to the controller and located upstream from the exhaust damper and proximate to the turbine outlet; and wherein the controller is configured to generate a second signal which causes the exhaust damper to at least partially open or at least partially close based on an axial exit velocity data signal provided by the flow velocity sensor.

6. The power plant as in claim 1, further comprising a power generator coupled to the gas turbine and a power sensor coupled to the power generator, and wherein the controller is configured to generate a second signal which causes the exhaust damper to at least partially open or at least partially close based on a power output signal generated by the power sensor.

7. The power plant as in claim 1, wherein the controller is configured to generate a second signal which causes the exhaust damper to at least partially open or at least partially close based on a predefined axial exit velocity limit inputted or stored in the controller.

8. The power plant as in claim 7, wherein the predefined axial exit velocity limit is based on mechanical limitations of turbine rotor blades of one or more stages of turbine rotor blades within the turbine.

9. The power plant as in claim 7, wherein the predefined axial exit velocity limit is based on mechanical limitations of turbine rotor blades of the last stage of turbine rotor blades within the turbine proximate to the turbine outlet.

10. The power plant as in claim 1, further comprising:
    a first steam flow sensor positioned downstream from the heat recovery steam generator and electronically connected to the controller;
    a steam turbine fluidly coupled to the heat recovery steam generator;
    a second steam flow sensor positioned downstream from the steam turbine and electronically connected to the controller;
    wherein the controller is configured to generate a second signal which causes the exhaust damper to at least partially open or at least partially close based on a steam flow rate signal generated by the first steam flow sensor or the second steam flow sensor.

11. A method for controlling power plant output, comprising:
    selecting an operation mode for a gas turbine of a power plant via an input to a controller, the power plant comprising: a combustor downstream from a compressor; a turbine downstream from the combustor; an exhaust duct downstream from a turbine outlet, wherein the exhaust duct receives exhaust gas from the turbine outlet; an exhaust damper operably connected to a downstream end of the exhaust duct; a heat recovery steam generator having an inlet portion connected to a downstream end of the exhaust damper; and the controller electronically coupled to the exhaust damper; and
    adjusting exhaust backpressure at the turbine outlet of the gas turbine via the exhaust damper, wherein the controller generates a signal during an operating period of peak demand which causes the exhaust damper to at least partially close based on the operation mode selected;
    wherein the signal is based on data received from a sensor electronically coupled to the controller, the sensor measuring at least one of an exhaust pressure at the turbine outlet, an exhaust exit velocity exiting the turbine outlet, a power output of the power plant, or a steam flow rate from the heat recovery steam generator.

12. The method as in claim 11, further comprising fully opening inlet guide vanes at an inlet of a compressor of the gas turbine and partially closing the exhaust damper to increase thermal energy output of the gas turbine.

13. The method as in claim 11, wherein adjusting exhaust backpressure at the outlet of the turbine comprises partially closing the exhaust damper via the controller to restrict axial exit velocity of the exhaust gas exiting the turbine outlet.

14. The method as in claim 11, further comprising monitoring axial exit velocity of the exhaust gas via a flow velocity sensor electronically coupled to the controller and upstream from the exhaust damper.

15. The method as in claim 14, further comprising at least partially closing the exhaust damper and increasing the exhaust backpressure when the axial exit velocity of the exhaust gas approaches a predefined axial exit velocity limit inputted or stored in the controller.

* * * * *